United States Patent
Shibata et al.

(10) Patent No.: US 7,634,473 B2
(45) Date of Patent: Dec. 15, 2009

(54) DOCUMENT RETRIEVAL APPARATUS

(75) Inventors: Hirohito Shibata, Shibata (JP); Takeshi Yoshioka, Kanagawa (JP); Toshiya Yamada, Kanagawa (JP); Hitoshi Ikeda, Kanagawa (JP); Motofumi Fukui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 151 days.

(21) Appl. No.: 11/339,519

(22) Filed: Jan. 26, 2006

(65) Prior Publication Data

US 2006/0282415 A1    Dec. 14, 2006

(30) Foreign Application Priority Data

Jun. 9, 2005    (JP)    ............... 2005-169203

(51) Int. Cl.
G06F 17/30    (2006.01)
G06F 7/00    (2006.01)

(52) U.S. Cl. ................. 707/5; 707/2; 707/102
(58) Field of Classification Search .......... 707/205
See application file for complete search history.

(56) References Cited

U.S. PATENT DOCUMENTS 4,876,665 A * 10/1989 Iwai et al. ............. 707/200

2006/0282415 A1 * 12/2006 Shibata et al. ............. 707/3

FOREIGN PATENT DOCUMENTS

| JP | 11073420 A | * | 3/1999 |
| JP | A 11-73420 | | 3/1999 |
| JP | A 11-250077 | | 9/1999 |

OTHER PUBLICATIONS

Salton, A Vector Space Model for Automatic Indexing, 1975, Association for Computing Machinery Inc, vol. 18, No. 11, pp. 613-620.*

* cited by examiner

*Primary Examiner*—Greta L Robinson
*Assistant Examiner*—James J Wilcox
(74) *Attorney, Agent, or Firm*—Oliff & Berridge, PLC

(57) ABSTRACT

A document retrieval apparatus for retrieving documents from a document database in which documents are registered, and displaying the retrieved documents, the document retrieval apparatus includes: a keyword input unit for accepting input of a retrieval keyword for retrieving the documents; a document retrieval unit for retrieving the documents from the document database on the basis of the retrieval keyword; a keyword weight calculation unit for calculating those weights of the retrieval keyword which feature contents of the retrieved documents, as keyword weights; and a display process unit for displaying the retrieved documents in a state where the retrieval keyword contained in the retrieved documents is presented in display aspects conforming to the keyword weights.

10 Claims, 7 Drawing Sheets

FIG. 8

DOCUMENT RETRIEVAL APPARATUS

BACKGROUND OF THE INVENTION

1. Field of the Invention

The present invention relates to a document retrieval apparatus which retrieves and displays a document on the basis of a retrieval keyword, and more particularly to a technique which visually clarifies the degree of relevance between a document and a retrieval keyword.

2. Background Art

It has been performed to retrieve desired documents on the basis of a retrieval keyword designated by a user, from a database in which a large number of documents are accumulated, Web sites which lie on a network, or the like.

In such a document retrieval, when those positions in the retrieved documents at which one or more retrieval keywords utilized for the retrieval are used are known, the necessities of the retrieved documents are easily judged on the basis of the retrieval keywords in the retrieved documents.

In order to cope with such a requirement, there has been put into practical use a method wherein the retrieval keywords are highlighted and displayed in the retrieved documents so as to become conspicuous.

Besides, in the document retrieval, it has been performed to retrieve documents by using similar words obtained by the thesaurus expansion of retrieval keywords. When it is known if the original retrieval keywords are contained in the documents thus retrieved using the similar words, or which of the retrieval keywords has been expanded to the individual similar words, conveniently a ground for the retrieval of each retrieved document can be clarified.

In this regard, in the document retrieval performing the thesaurus expansion of a retrieval keyword, there has been proposed an invention wherein the retrieval keyword and thesaurus-expanded similar words are highlighted and displayed at different densities in a retrieved document, in conformity with the degrees of similarity between the retrieval keyword and the similar words (refer to JP-A-11-250077).

Besides, there has been proposed an invention wherein similar words are highlighted and displayed in retrieved documents, and wherein retrieval keywords are denoted in small sizes under the similar words in order to clarify which of the retrieval keywords the similar words have been expanded from (refer to JP-A-11-73420).

SUMMARY OF THE INVENTION

The above prior-art techniques perform to highlight and display the retrieval keyword and the expanded words in the retrieved document, and further to make the highlighting aspects of the expanded words different in conformity with the degrees of similarity thereof to the retrieval keywords.

However, even an identical word contained in a document differs in a weight with respect to the described contents of the document (for example, the extent to which the word features the described contents), every document. It is accordingly important for a user, who intends to find out a desired document, to arrange a large number of retrieved documents in conformity with the weights of the retrieval keyword and the similar words.

That is, in the case of the large number of retrieved documents, it becomes important to score the retrieved documents and to rank the documents in the order of higher scores.

As methods of calculating the weights, there have been known various ones, such as the TF wherein the weights are calculated on the basis of the occurrence frequencies of words in a document, the IDF wherein the weights are calculated on the basis of the comparisons of the occurrence frequencies of words with other documents, the TF-IDF wherein the weights are calculated by combining the TF and the IDF, and a method wherein the weights are calculated on the basis of a probabilistic technique. By way of example, the weights of the words are calculated in proportion to the occurrence frequencies of the words in each document, and the retrieved documents are ranked in conformity with the weights of the retrieval keyword.

However, even in a case where the retrieved documents have been ranked and arranged, the degree of relevance of each word in the document, to the described contents of the document, differs every document, and hence, the user sometimes feels inconvenience in finding out the desired document from among the retrieved documents.

By way of example, in a case where the retrieval has been performed using a plurality of retrieval keywords, the degrees of importance of the respective keywords are sometimes different in accordance with the user's intention. When note is taken of the degrees of importance of the retrieval keywords, the result of the ranking as stated above does not hold true, and the job of finding out the desired document from among the large number of retrieved documents becomes complicated in some cases.

The present invention has been made in view of the situation of the prior art, and it has for its object to make a user capable of grasping the relevances between words for use in retrieval and individual documents which contain the words, at a look among the individual retrieved documents.

The present invention consists in a document retrieval apparatus wherein documents are retrieved from a document database in which documents are registered, so as to display the retrieved documents, characterized by including a keyword input unit for accepting input of a retrieval keyword for retrieving the documents; a document retrieval unit for retrieving the documents from the document database on the basis of the retrieval keyword; a keyword weight calculation unit for calculating those weights of the retrieval keyword which feature contents of the retrieved documents, as keyword weights; and a display process unit for displaying the retrieved documents in a state where the retrieval keyword contained in the retrieved documents is presented in display aspects conforming to the keyword weights, a document retrieval program which is configured by causing a computer to incarnate such a document retrieval apparatus, and a document retrieval method which is performed by such a document retrieval apparatus.

In accordance with the invention, accordingly, the document retrieval unit retrieves the documents from the document database on the basis of the retrieval keyword inputted from the keyword input unit, the keyword weight calculation unit calculates as the keyword weights, those weights of the retrieval keyword which feature the contents of the retrieved documents, and the retrieved documents are displayed by the display process unit in the state where the retrieval keyword contained in the retrieved documents is presented in the display aspects conforming to the keyword weights.

Thus, the respective retrieved documents are displayed in the aspects in which the weights of the keyword contained in these documents can be judged at a look, and it is possible to easily perform, for example, the job of classifying such retrieved documents with note taken of the weights of respective keywords.

The display aspects may be displays which permit the user to identify the keyword weights, and the keywords may well be displayed by employing any of, for example, changing the density of highlighting, changing the sort of meshing, changing the gradation of the background, changing the sort of shading, changing a font size, changing the sort of a font, and changing the sort of an underline. It is also allowed to change the display color of the background of the keyword.

The display process unit may well display the retrieved documents in a state where the display aspects of the retrieval keyword contained in the retrieved documents are made different on the basis of reference values which prescribe the display aspects conforming to the keyword weights.

In a case, for example, where a plurality of background colors are prepared in correspondence with the reference values and where the background colors to be bestowed on the keyword are determined in conformity with the calculated keyword weights, the user can easily judge the degrees of the weights of the keyword from the background colors.

Besides, the document retrieval apparatus may well include a document ranking unit for calculating a summation of the keyword weights every retrieved document, so as to rank the retrieved documents in accordance with summation values, whereby the keyword weights are utilized for the ranking of the retrieved documents.

It is also allowed that such retrieval keywords are endowed with initial weights beforehand, and that the keyword weight calculation unit calculates the keyword weights in consideration of the initial weights.

Thus, by way of example, the initial weights conforming to the user's intention of the retrieval are bestowed on the plurality of retrieval keywords as different values, whereby the retrieval keyword at a higher degree of importance for the user can be displayed more emphatically, and hence, the user is permitted to easily select his/her desired document.

Incidentally, the initial weights may, for example, be explicitly bestowed on the retrieval keywords by the user, be automatically bestowed by the keyword input unit on the basis of the designation sequence of the retrieval keywords, or be previously determined for the respective retrieval keywords. How to bestow the initial weights does not come into question.

The document retrieval apparatus according to the invention can also be employed for retrieval based on relevant words to the retrieval keywords. It is possible that a thesaurus/dictionary unit is included for holding relevant words which are relevant to words, and degrees of relevance as indicate degrees of the relevance; that the document retrieval unit retrieves documents from the document database on the basis of the retrieval keywords, and the relevant words of the retrieval keywords as are held in the thesaurus/dictionary unit; that the keyword weight calculation unit calculates keyword weights of the relevant words of the retrieval keywords in consideration of the corresponding degrees of relevance of the relevant words; and that the display process unit displays the retrieved documents in a state where the relevant words of the retrieval keywords as are contained in the retrieved documents are presented in display aspects conforming to the keyword weights.

Thus, also in a document retrieval based on thesaurus expansion, the relevant words of the retrieval keywords can be presented in the aspects which conform to the weights in the respective documents.

Incidentally, the "relevant words" are words having relevances to the words, for example, synonyms, similar words, words having upper-rank/lower-rank relations, and words having part/entirety relations.

Besides, the document retrieval apparatus according to the invention can also be employed for a relevant document retrieval in which retrieval conditions are inputted in a document format, not by retrieval keywords or by a logical expression including the retrieval keywords in combination. More specifically, in a document retrieval apparatus wherein a document is retrieved with the retrieval keywords being feature words which feature contents of an inputted document, so as to display the retrieved document; it is possible that the display process unit displays the input document in a state where the retrieval keywords contained in the input document are presented in display aspects conforming to keyword weights in the retrieved document. Accordingly, when the user looks at the words which are displayed in the different display aspects in the input document, he/she can know the fact that the retrieved document has been acquired on the basis of the pertinent words, and he/she can visually grasp the degrees of importance of the pertinent words in the retrieved document.

Usable as the feature words are, for example, a word which exhibits a high occurrence frequency in the document, a word whose occurrence frequency higher than in any other document, and a word which is important in view of its occurrence position (for example, a word used as a title).

In the case of employing the document retrieval apparatus for the relevant document retrieval, it is also allowed that a keyword selection input unit is included for accepting selection of the retrieval keyword from either of the input document and the retrieved document; and that the display process unit displays the documents in a state where words corresponding to the selected retrieval keyword, in the other document, are presented in discriminative display aspects.

Thus, when a word is selected in, for example, the input document, retrieval keywords corresponding to the word in the retrieved document become definite, and the relation between the input document and the retrieved document as based on the retrieval keywords can be easily grasped.

It is also allowed that a candidate document selection input unit is included for accepting selection of a retrieved document from among a plurality of displayed retrieved document candidates; and that the display process unit displays the input document in a state where the retrieval keywords contained in the input document are presented in the display aspects conforming to the keyword weights in the selected retrieved document.

Thus, in a case where the list of the plurality of retrieved documents acquired on the basis of the input document has been displayed in a state where the input document, for example, is being browsed, the user designates any candidate in the list, whereby he/she can know those words in the input document which are the retrieval keywords used for the retrieval of the designated retrieved document, and he/she can further grasp the weights of the words in the retrieved document.

According to the present invention, a user can identify the weights of a retrieval keyword in retrieved documents, at a look, and he/she can easily grasp a ground for the retrieval of each document. Thus, the user can quickly judge whether or not each retrieved document is his/her desired document, so that he/she is permitted to efficiently perform a document retrieval.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

The present invention will be concretely described in conjunction with an embodiment shown in the drawings.

Figure 1:
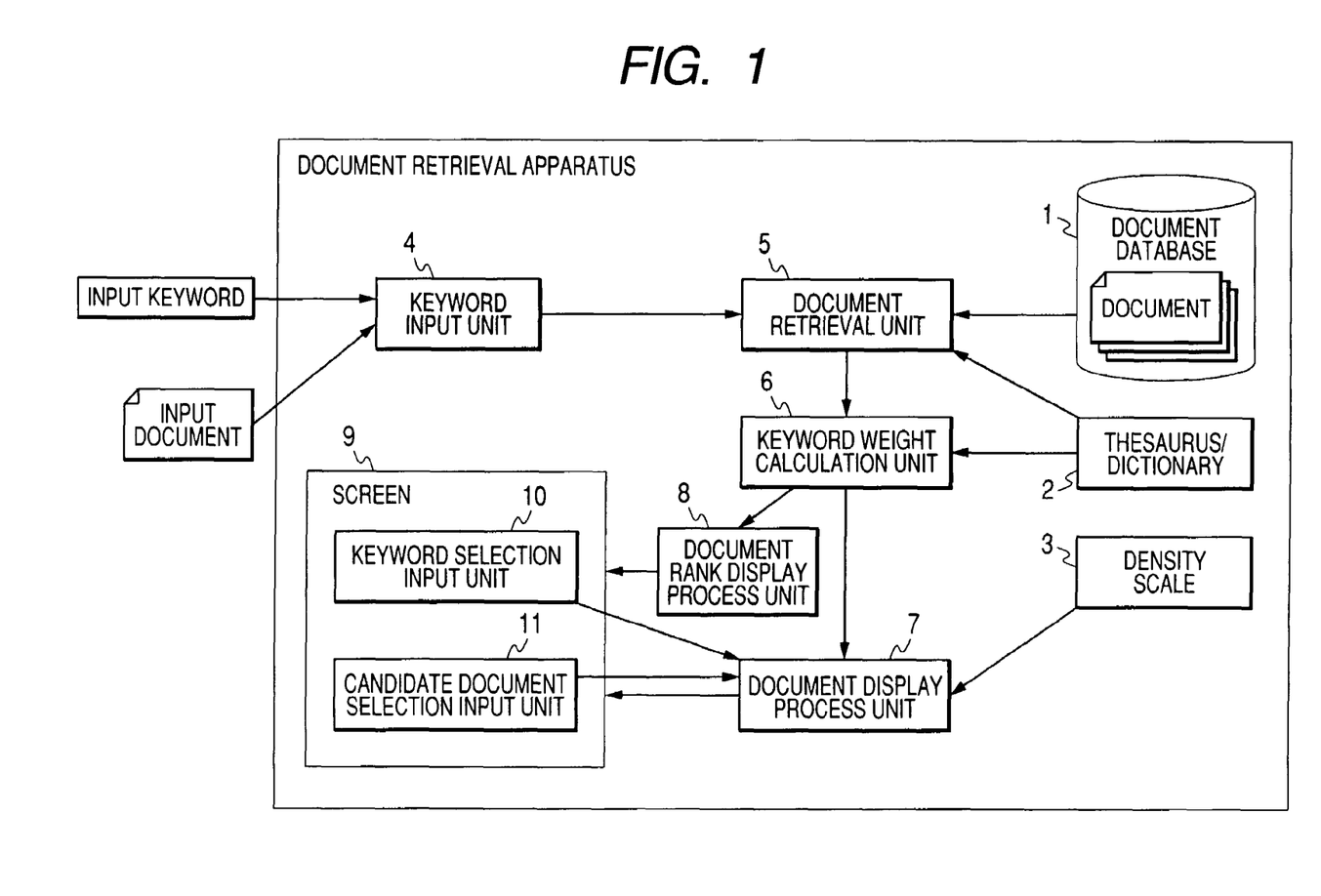
FIG. 1 is a functional block diagram of a document retrieval apparatus according to an example of the present invention.

Shown in FIG. 1 is the functional configuration of a document retrieval apparatus according to the invention.

The document retrieval apparatus includes a document database 1 in which a plurality of documents to be retrieved are registered, a thesaurus/dictionary unit 2 for holding information on the relevant words of words, a density scale 3 which prescribes display aspects conforming to retrieval keyword weights, a keyword input unit 4 for accepting the input of a retrieval keyword in a logical expression format or a retrieval input statement format, a document retrieval unit 5 for retrieving documents from the document database 1 on the basis of the retrieval keyword, a keyword weight calculation unit 6 for calculating those weights of the retrieval keyword which are contained in the respective documents, as to the individual retrieved documents, a document display process unit 7 for displaying the retrieved documents in display aspects in which the retrieval keyword weights contained in the retrieved documents are identifiable, a document rank display process unit 8 for ranking the retrieved documents for the sake of a ranking display, and a screen 9 on which the retrieved documents are displayed.

The process of document retrieval in the document retrieval apparatus according to the invention will be outlined.

When the keyword input unit 4 accepts a retrieval keyword from a user, the document retrieval unit 5 retrieves corresponding documents from the document database 1 on the basis of the retrieval keyword, and the keyword weight calculation unit 6 calculates the keyword weights of the retrieval keyword in the retrieved documents. Besides, the document display process unit 7 determines display aspects by referring to the density scale 3 in accordance with the keyword weights, and it causes the screen 9 to display the retrieved documents in the display aspects of the retrieval keyword.

Incidentally, the document rank display unit 8 calculates the summations of the keyword weights of the respective retrieved documents, and it ranks the retrieved documents in accordance with the summation values of the keyword weights so as to display the ranking between the retrieved documents, on the screen 9.

Next, the contents of processes which the document retrieval apparatus executes will be described in connection with examples in which the input formats of retrieval keywords are different.

First, a case where a single retrieval keyword is contained in a retrieval logical expression accepted from the keyword input unit 4 will be described with reference to FIG. 2.

The keyword input unit 4 accepts the retrieval keyword 21 "color", and the document retrieval unit 5 retrieves documents from the document database 1 on the basis of the retrieval keyword 21, thereby to acquire the document A which contains "color" identical to the retrieval keyword 21 as a word 22, and the document B which contains the "color" identical to the retrieval keyword 21 as a word 23.

The word 22 occurs twice in the document A, while the word 23 occurs once in the document B. In this example employing the TF-IDF, therefore, the word 22 has a larger value than the word 23 as a keyword weight calculated by the keyword weight calculation unit 6.

The document display process unit 7 determines the display aspects of the words 22 and 23 by referring to the density scale 3 on the basis of the calculated keyword weights, and it displays on the screen 9, the documents A and B with the words 22 and 23 presented in the determined display aspects.

By the way, in this example, the plurality of retrieved documents are displayed in parallel on the screen 9, but the individual documents may well be displayed on the screen 9 in changeover fashion.

Figure 3:
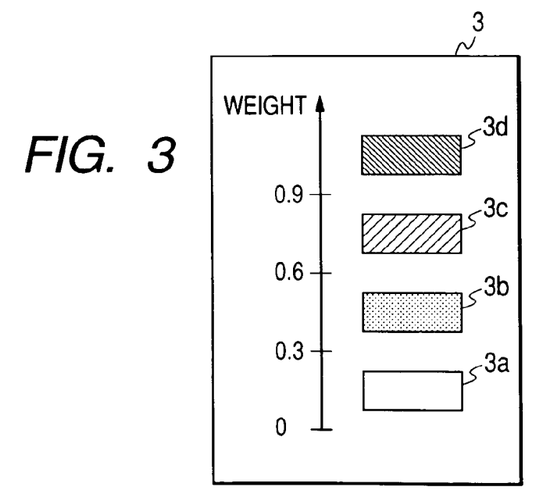
FIG. 3 is a diagram for explaining a setting example of a density scale in the document retrieval apparatus according to the example of the invention.

In the density scale 3, as exemplified in FIG. 3, a display aspect 3a is designated in a case where the keyword weight is less than 0.3, a display aspect 3b in a case where the keyword weight is at least 0.3 and less than 0.6, a display aspect 3c in a case where the keyword weight is at least 0.6 and less than 0.9, and a display aspect 3d in a case where the keyword weight is at least 0.9. Thus, the density of the display aspect is heightened in accordance with the weight, and the display aspects 3a and 3d are respectively set so as to become the lowest degree of emphasis and the highest degree of emphasis.

Accordingly, when the keyword weights calculated by the keyword weight calculation unit 6 are respectively assumed to be 1.0 for the word 22 and 0.5 for the word 23, the words 22 and 23 are respectively displayed in the display aspects 3d and 3b in the corresponding documents.

Thus, although the words 22 and 23 corresponding to the retrieval keyword are the identical word "color", the word 22 is displayed more emphatically than the word 23, and hence, it can be grasped from the display aspects that the document A is larger than the document B in the weight concerning the keyword 21. That is, it is understood that, in this example, the feature of document contents is more expressed by the word "color" in the document A.

Next, a case where a plurality of retrieval keywords are contained in a retrieval logical expression accepted from the keyword input unit 4 will be described with reference to FIG. 4.

The keyword input unit 4 accepts the retrieval keyword 41 "color" and the retrieval keyword 42 "copy", and the document retrieval unit 5 retrieves documents from the document database 1 on the basis of the retrieval keywords 41 and 42, thereby to acquire the document A which contains words identical to the retrieval keywords 41 and 42 as words 43 and 44, respectively, and the document B which contains the words identical to the retrieval keywords 41 and 42 as words 45 and 46, respectively.

More specifically, in the document A, the retrieval keyword "color" occurs twice, and the retrieval keyword "copy" occurs once. In the document B, the retrieval keyword "color" occurs once, and the retrieval keyword "copy" occurs twice.

Also in this case, as in the case of the single retrieval keyword, the keyword weights of the respective words are calculated so as to determine conforming display aspects, and the document A is displayed with the words 43 and 44 presented in the display aspects conforming to the respective keyword weights, while the document B is displayed with the words 45 and 46 presented in the display aspects conforming to the respective keyword weights.

In the document A, the word "color" occurs twice, and the word "copy" occurs once, while in the document B, the word "color" occurs once, and the word "copy" occurs twice. In this example employing the TF-IDF, therefore, the word "color" has a larger value than the word "copy" as a keyword weight calculated by the keyword weight calculation unit 6, in the document A, and the word "copy" has a larger value than the word "color" in the document B.

As in the foregoing, accordingly, the word "color" is displayed more emphatically than the word "copy" in the document A, whereas the word "copy" is displayed more emphatically than the word "color" in the document B, and even the same words are presented in the display aspects differing in the respective documents, so that the weights of the individual words in the respective documents can be discriminated at a look.

Here in this example, the document rank display process unit 8 executes also a process in which the retrieved documents to be displayed on the screen are ranked by calculating the summations of the weights of the keywords contained in the respective retrieved documents.

Thus, even in a case where a large number of documents have been retrieved, the user can easily find out the documents to which the degrees of relevance of the retrieval keywords are great, owing to the execution of the ranking process.

Here, the display aspects of the retrieval keywords are made different in accordance with the respective retrieved documents as stated above, whereby an advantage different from the ranking of the retrieved documents can be brought forth.

Assuming, for example, that the reference weights of the respective words are "1" in the above example, the ranking process results in that the summation of the weights of the retrieval keywords "color" and "copy" is "3" in the document A, while the summation of the weights of the retrieval keywords "color" and "copy" is "3" in the document B, and the ranks of both the documents become equal.

On the other hand, in the display aspect process of the retrieval keywords, the retrieval keyword "color" is displayed more emphatically in the document A, and the retrieval keyword "copy" is displayed more emphatically in the document B.

Therefore, in a case, for example, where the user considers either of the two retrieval keywords to be more important, he/she can easily find out the desired document from within the group of retrieved documents by performing the job of finding the document in which the more important keyword is more emphasized.

In the above example, in a case, for example, where the user attaches importance to any of a plurality of retrieval keywords for use in a retrieval, it is effective to previously endow the respective keywords with initial weights corresponding to the degrees of importance, and the user's intention of the retrieval can be reflected on the retrieval and a display.

Assuming, for example, that the initial weight of "0.5" is bestowed on the retrieval keyword "color", while the initial weight of "1.5" is bestowed on the retrieval keyword "copy", the weight of the keyword "color" in the document A becomes 2 (the number of times of occurrences)×0.5 (the initial weight)=1.0, and the weight of the keyword "copy" in the document A becomes 1.5. Likewise, the weight of the keyword "color" in the document B becomes 0.5, and the weight of the keyword "copy" in the document B becomes 3.0.

Here, in the case where the initial weights are not bestowed, the weight (the number of times of occurrences) of the keyword "color" in the document A becomes 2.0, while that of the keyword "copy" in the document A becomes 1.0, and hence, the weight 2.0 of the "color" in the document A is larger than the weight 1.0 of the "copy". In contrast, when the initial weights are bestowed as stated above, the weight 1.0 of the "color" in the document A becomes smaller than the weight 1.5 of the "copy". The weights of the keyword "color" and the keyword "copy" are reversed owing to the bestowal of the initial weights, so that although the keyword "color" is displayed more emphatically than the keyword "copy" without the bestowal of the initial weights, the keyword "copy" is displayed more emphatically than the keyword "color" by the bestowal of the initial weights. Accordingly, the user is permitted to easily identify which is the retrieved document desired by him/her, by bestowing the initial weights that correspond to the intention of the retrieval.

Thus far, there have been described the document displays in the cases where the documents containing the retrieval keywords have been retrieved. Next, a document display in the case where documents which contain relevant words to retrieval keywords obtained by thesaurus-expanding a retrieval keyword have been retrieved will be described with reference to FIG. 5.

Figure 6:
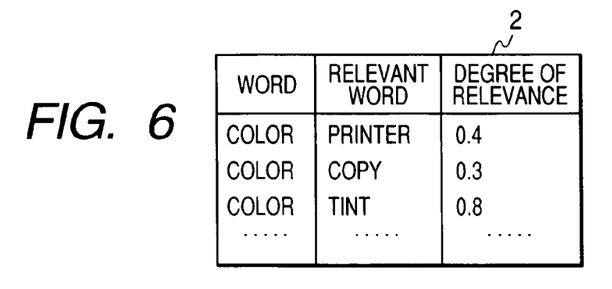
FIG. 6 is a diagram for explaining a setting example of a thesaurus/dictionary in the document retrieval apparatus according to the example of the invention.

Incidentally, relevant words which are relevant to words, and those degrees of relevance which indicate the degrees of relevance between the words and the relevant words, are set in the thesaurus/dictionary unit 2. As exemplified in FIG. 6, there are set a relevant word "printer" which is relevant to a word "color" at a degree of relevance of "0.4", a relevant word "copy" which is relevant to the word "color" at a degree of relevance of "0.3", and a relevant word "tint" which is relevant to the word "color" at a degree of relevance of "0.8".

Figure 5:
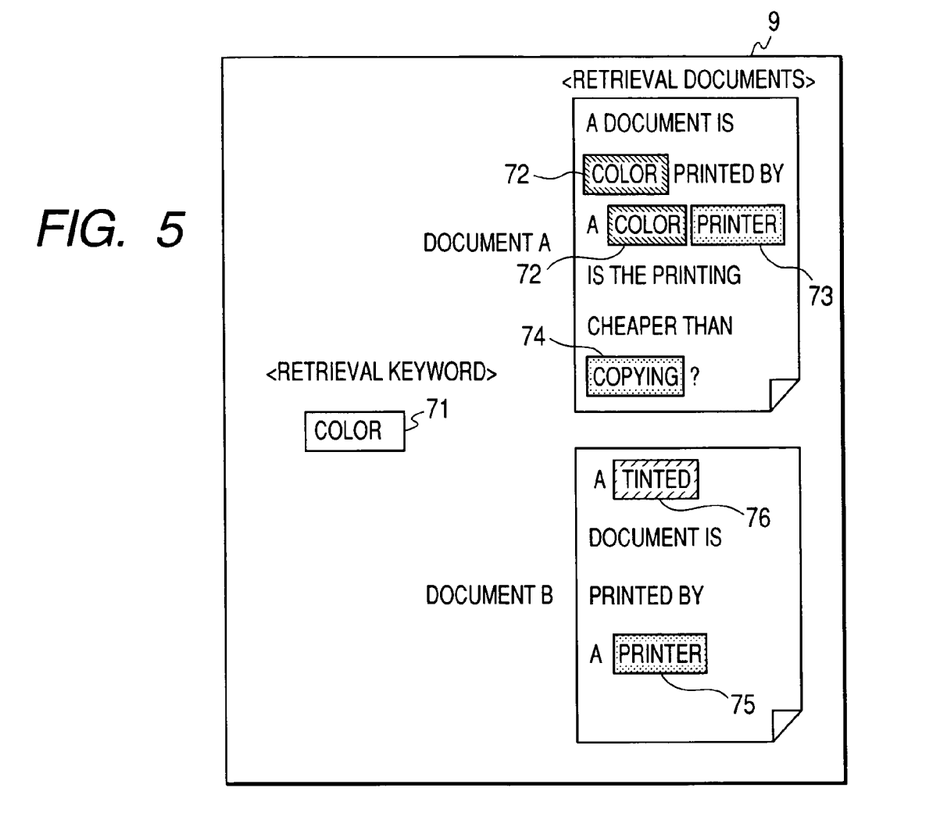
FIG. 5 is a diagram for explaining a display example of retrieved documents in the document retrieval apparatus according to the example of the invention.

When the keyword input unit 4 accepts a retrieval keyword "color", the document retrieval unit 5 expands the retrieval keyword "color" by referring to the thesaurus/dictionary unit 2, thereby to acquire relevant words "printer", "copy" and "tint" to the retrieval keyword "color". Besides, the document retrieval unit 5 retrieves documents from the document database 1 by using the "color", "printer", "copy" and "tint" as keywords, so as to retrieve the documents each of which contains at least one of these keywords. In the example of FIG. 5, there are retrieved a document A which contains a word identical to the "color" as words 72, and words identical to the relevant words "printer" and "copy" as respective words 73 and 74, and also a document B which contains words identical to the relevant words "printer" and "tint" as respective words 75 and 76.

Here, the keyword weight calculation unit 6 calculates the keyword weights of the retrieval keyword and the relevant words in the individual retrieved documents, and the document display process unit 7 causes the screen 9 to display the retrieved documents with the keywords of the retrieval keyword and the relevant words presented in display aspects conforming to the weights thereof.

In this example, the weights are calculated in such a way that the occurrence frequencies of the relevant words of the retrieval keyword in each retrieved document is multiplied by the degrees of relevance of the relevant words. In the document A, the word "printer" occurs once, and its degree of relevance to the word "color" is 0.4, so that the weight of the word "printer" becomes 0.4, and the weight of the word "copy" becomes 0.3. Likewise, in the document B, the weight of the word "printer" becomes 0.4, and the weight of the word "tint" becomes 0.8.

Therefore, although the numbers of times of occurrences of the word "printer" and the word "tint" in the document B are both "one", the calculated keyword weights of these words are different because of the different degrees of relevance to the retrieval keyword, and hence, the words are displayed in the display aspects in which the word "tint" of the higher degree of relevance is more emphasized than the word "printer" of the lower degree of relevance.

Accordingly, also in the document retrieval which uses the thesaurus-expanded relevant words, the retrieval keyword before the expansion and the relevant words are displayed in the specified display aspects, so that a ground for the retrieval of the retrieved documents can be easily grasped. In addition, since the display aspects of the relevant words have the degrees of relevance thereof taken into consideration, the retrieval keyword before the expansion is presented in the display aspect which is more emphasized than the display aspects of the relevant words, and importance is attached to the retrieval keyword forming the original retrieval ground, in the display aspect.

Here, in a case where a relevant word overlaps, for example, where a relevant word "printer" to "color" is also a relevant word to "print" when the plurality of retrieval keywords "color" and "print" have been inputted, a keyword weight may be calculated by employing the summation of the degrees of relevance of the overlapping relevant word. Assuming that the degree of relevance of the relevant word "printer" to the word "color" is 0.5, and that the degree of relevance of the relevant word "printer" to the word "print" is 0.3, the sum 0.8 between 0.5 and 0.3 may be employed for the calculation of the keyword weight as the degree of relevance of the "printer".

Next, a relevant document retrieval in which retrieval conditions are inputted in a document format will be described with reference to FIG. 7.

Figure 7:
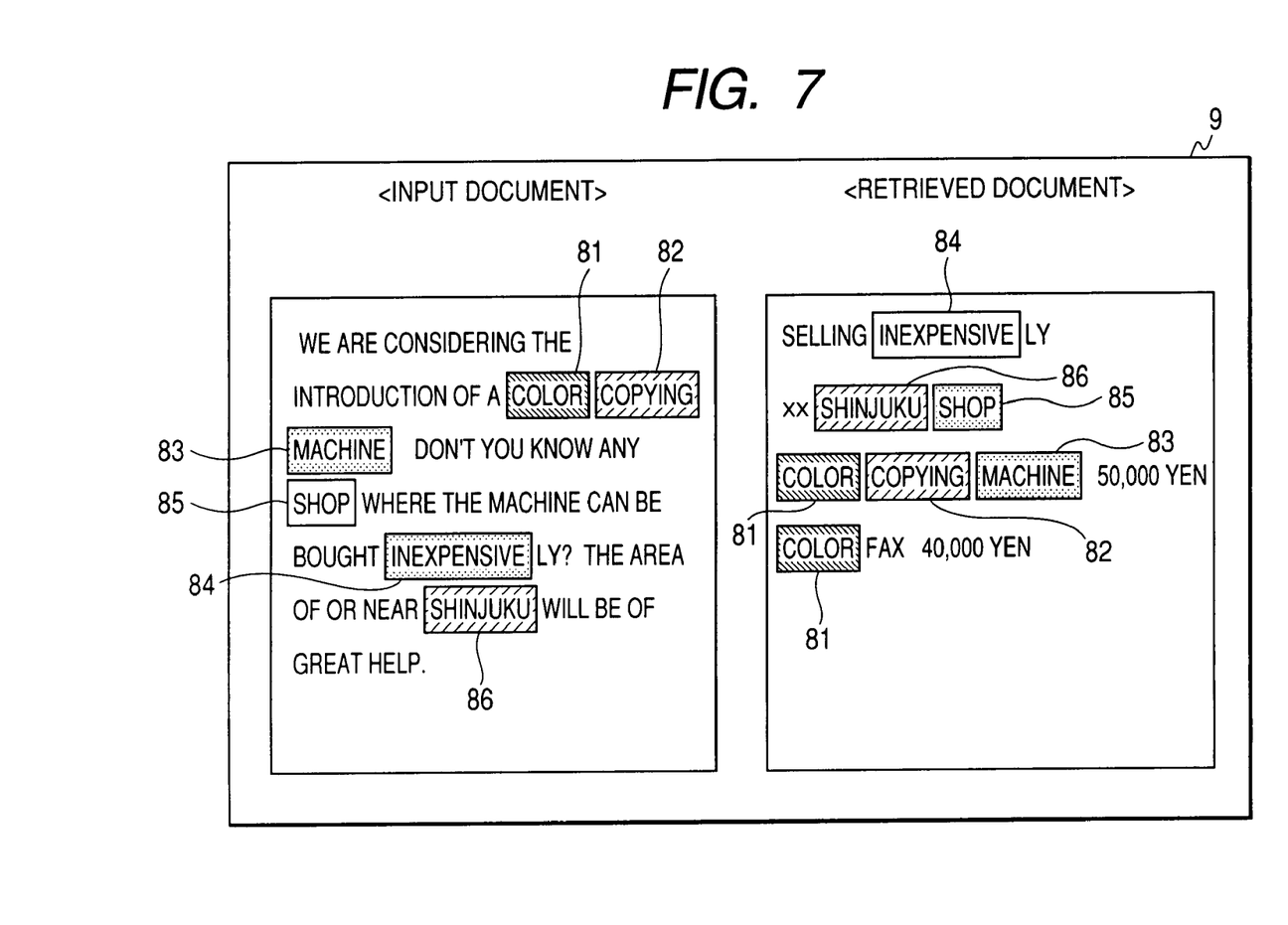
FIG. 7 is a diagram for explaining a display example of a retrieved document in the document retrieval apparatus according to the example of the invention.

As shown by a display example of the screen 9 in FIG. 7, when the keyword input unit 4 accepts an input document, the input document is displayed on the left side of the screen 9, and the document retrieval unit 5 retrieves any document with retrieval keywords being feature words in the input document ("inexpensive", "Shinjuku", "shop", "color", "copy" and "machine"), thereby to display the retrieved document as shown on the right side of the figure. In displaying the retrieved document, the keyword weight calculation unit 6 calculates the keyword weights of the words "inexpensive", "Shinjuku", "shop", "color", "copy" and "machine" corresponding to the retrieval keywords in the retrieved document, and the document display process unit 7 causes the screen 9 to display the words corresponding to the respective retrieval keywords in the retrieved document, in display aspects conforming to the keyword weights, and it also causes the screen 9 to display the respective retrieval keywords in the input document, in the display aspects conforming to the keyword weights in the retrieved document.

Accordingly, the retrieval keywords which are contained in the input document and the retrieved document in common are emphasis-displayed at the same intensities. Therefore, the user can know those of the retrieval keywords on the basis of which the retrieved document has been retrieved, and he/she can also grasp the weights of the retrieval keywords in the retrieved document.

Here, the feature words in the input document are selected in such a way, for example, that the keyword input unit 4 morphologically analyzes the input document, whereupon several higher-rank ones of obtained words as are regarded by the TF-IDF as featuring the described contents of the input document are adopted.

Figure 8:
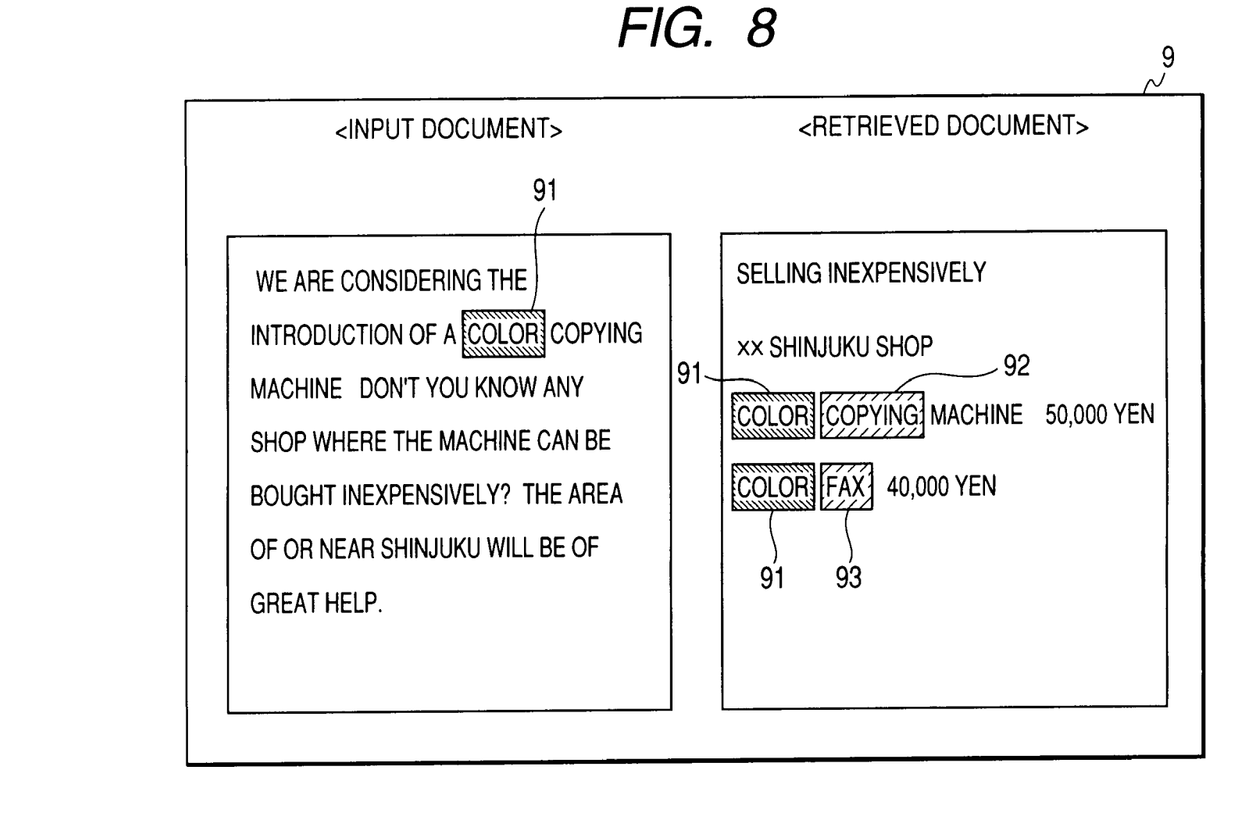
FIG. 8 is a diagram for explaining a display example of a retrieved document in the document retrieval apparatus according to the example of the invention.

Shown in FIG. 8 is another example of a retrieval result output which is based on the relevant document retrieval as stated above.

In this example, when the user selects a retrieval keyword from either of an input document and a retrieved document displayed on the screen 9, through a keyword selection input unit 10 included in the document retrieval apparatus, the document display process unit 7 functions to display a word corresponding to the selected retrieval keyword in the other document, in a distinguishable display aspect.

In a case, for example, where the user has selected a feature word "color" being one of retrieval keywords in the input document, the feature word "color" in the retrieved document is displayed in the aspect distinguishable from the other words in this document. By the way, in this example, the thesaurus expansion process as stated above is also performed, and words "copy" and "FAX" which are relevant words to the keyword "color" are similarly displayed in distinguishable aspects in the retrieved document.

Accordingly, when the user selects the word in either of the input document and the retrieved document which are displayed on the screen, the corresponding words in the other document are distinguishably displayed in the case where the selected word is the retrieval keyword or the feature word. Thus, those words stated in the document on the basis of which the retrieval process has been executed can be grasped at a look.

Figure 9:
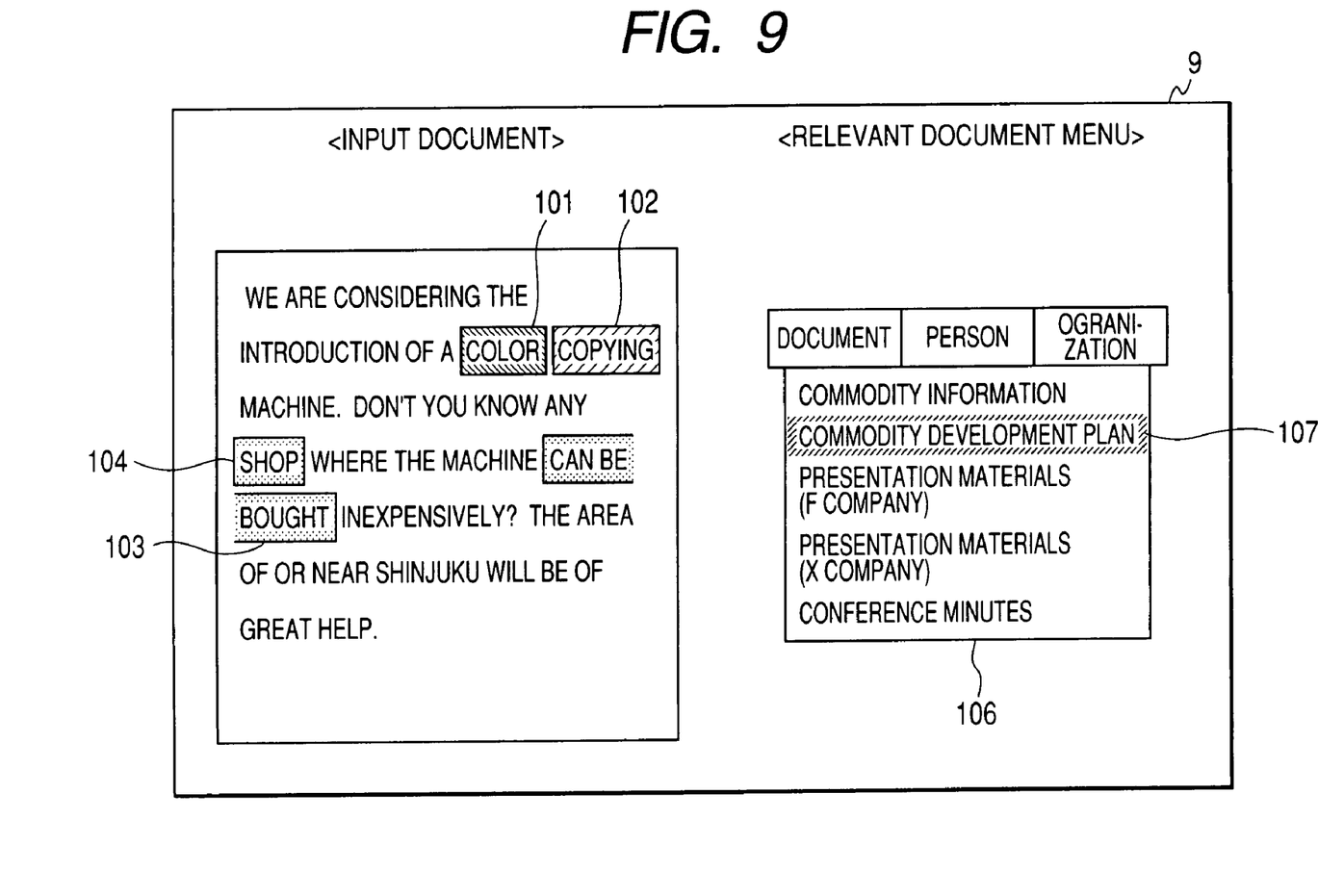
FIG. 9 is a diagram for explaining a display example of a retrieved document in the document retrieval apparatus according to the example of the invention.

Shown in FIG. 9 is still another example of a retrieval result output which is based on the relevant document retrieval as stated above.

In this example, the titles of a plurality of retrieved documents acquired by the relevant document retrieval are displayed on the screen 9 as a candidate list 106 by the document display process unit 7. Upon accepting the selection of any retrieved document in the list, from the user through a candidate document selection input unit 11, the document display process unit 7 functions to display words corresponding to keywords on the basis of which the selected retrieved document has been acquired, in display aspects conforming to the weights of the keywords in the retrieved document, in the input document.

By the way, in this example, the candidates of the plurality of retrieved documents are displayed in terms of the document titles, but other identification information items capable of specifying the documents, such as the creation dates and hours of the documents or the summaries of the documents, may well be displayed.

In the example shown in FIG. 9, the five retrieved documents of "Commodity Information", "Commodity Development Plan", "Presentation Materials (F Company)", "Presentation Materials (X Company)" and "Conference Minutes" are displayed as the retrieval candidates in the retrieved document list 106. When the user moves a mouse cursor to, for example, the retrieved document "Commodity Development Plan" 107 in the candidate list 106, corresponding words in the input document are displayed in display aspects which conform to the keyword weights of the retrieval keywords in the retrieved document 107. More specifically, the retrieved document 107 has been acquired with the keywords being words "color", "copy", "can be bought" and "shop" in the input document, and the weights of these words in the retrieved document 107 are expressed by the degrees of emphasis of the display aspects of the respective words.

Merely by selecting any of the retrieved document candidates, accordingly, the user can grasp at a look, those words in the input document on the basis of which the selected document is featured, and the degrees to which the words feature the retrieved document.

In each of the examples of the relevant document retrievals as mentioned above, the document is retrieved with the retrieval keywords being the feature words which feature the described contents of the input document, but retrieval can also be performed by employing another method.

By way of example, the retrieval can also be performed by employing a vector space model. In the vector space model, the features of each document are expressed by a vector whose dimensions are feature words contained in the document and in which the elements of the respective dimensions are the weights of the corresponding feature words in the document. The cosine of such vectors of two documents are obtained, and the similar documents are specified on the basis of the fact that the value of the cosine lies within a predetermined range. Accordingly, the document expressed by the vector whose cosine relative to the vector of the input document lies within the predetermined range can be retrieved as the document relevant to the input document. Incidentally, the TF-IDF values of the pertinent document, for example, can be used as the weights which are the elements corresponding to the respective dimensions of the document vector.

Figure 2:
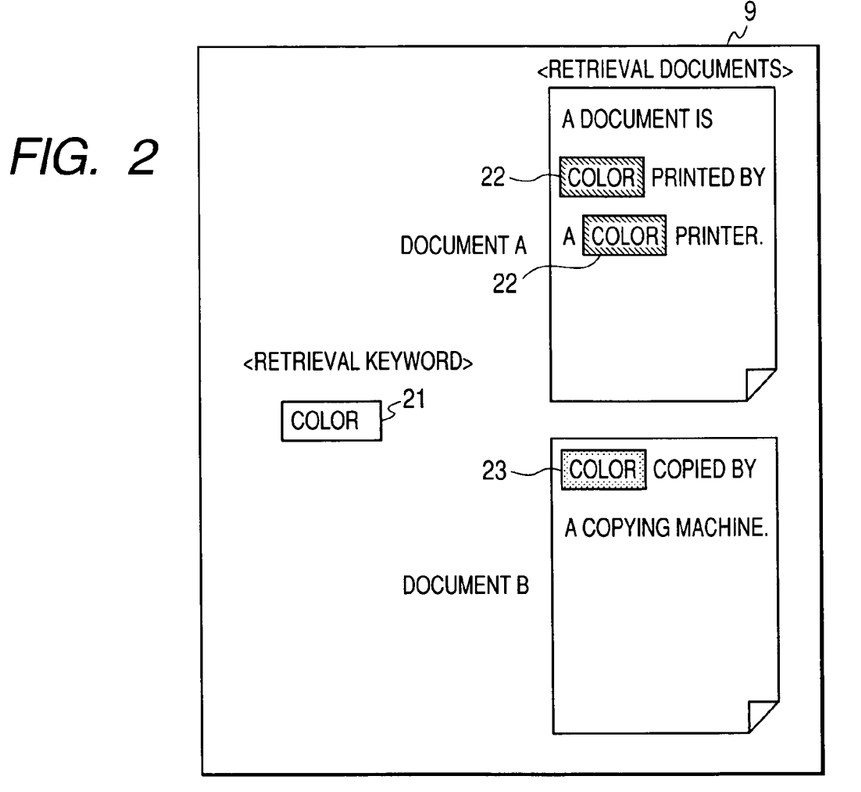
FIG. 2 is a diagram for explaining a display example of retrieved documents in the document retrieval apparatus according to the example of the invention.
Figure 4:
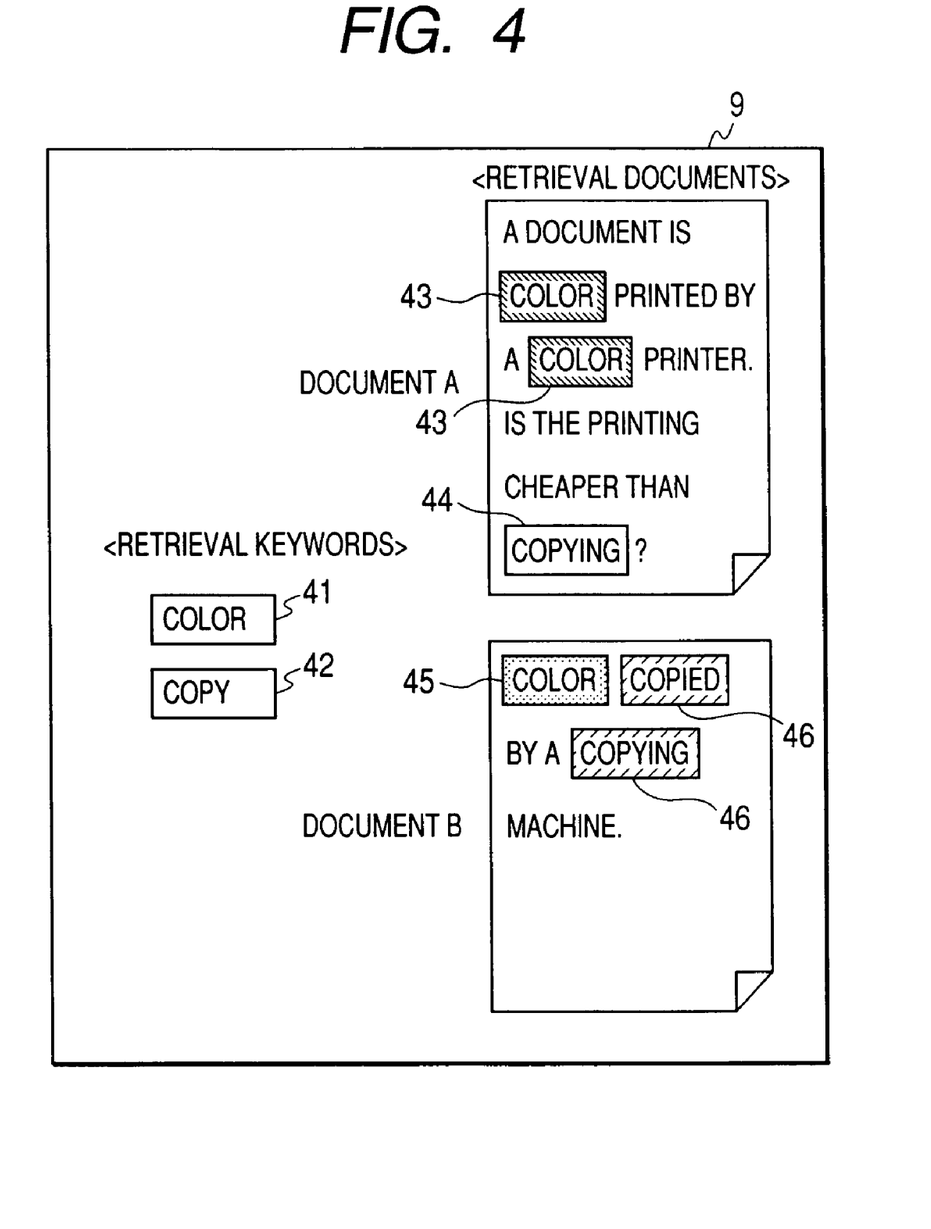
FIG. 4 is a diagram for explaining a display example of retrieved documents in the document retrieval apparatus according to the example of the invention.

FIG. 1:
   1 DOCUMENT DATABASE
   2 THESAUTUS/DICTIONARY
   3 DENSITY SCALE
   4 KEYWORD INPUT UNIT
   5 DOCUMENT RETRIEVAL UNIT
   6 KEYWORD WEIGHT CALCULATION UNIT
   7 DOCUMENT DISPLAY PROCESS UNIT
   8 DOCUMENT RANK DISPLAY PROCESS UNIT
   9 SCREEN
   10 KEYWORD SELECTION INPUT UNIT
   11 CANDIDATE DOCUMENT SELECTION INPUT UNIT FIG. 2:
   21, 22, 23 COLOR FIG. 4:
   41, 43, 45 COLOR
   42, 44, 46 COPY FIG. 5:
   71, 72 COLOR
   73, 75 PRINTER
   74 COPYING
   76 TINT FIG. 7:
   81 COLOR
   82 COPYING
   83 MACHINE
   84 INEXPENSIVE
   85 SHOP
   86 SHINJUKU FIG. 8:
   91 COLOR
   92 COPYING FIG. 9:
   101 COLOR
   102 COPYING
   103 CAN BE BOUGHT
   104 SHOP

What is claimed is:

1. A document retrieval apparatus for retrieving a retrieved document from a document database in which documents are registered, and displaying the retrieved document, the document retrieval apparatus comprising:
 a document retrieval unit for retrieving the retrieved document from the document database based on a retrieval keyword;
 a keyword weight calculation unit for calculating a keyword weight of the retrieval keyword, which represents at least a degree of relevance between the retrieval keyword and contents of the retrieved document, the keyword weight calculation unit calculating the keyword weight of the retrieval keyword in part by multiplying both:
 a number of occurrences of the retrieval keyword in the retrieved document, and
 a preset weight of the retrieval keyword, which is set before the document retrieval unit retrieves the retrieved document, and which represents a relative importance of the retrieval keyword with respect to other retrieval keywords in a same search query; and
 a display process unit for displaying the retrieved document in a state where the retrieval keyword contained in the retrieved document is presented in a display aspect reflecting the keyword weight by changing a density of highlighting, changing a sort of meshing and changing a gradation of a background.

2. The document retrieval apparatus according to claim 1, wherein the display process unit displays the retrieved document in a state where the display aspect of the retrieval keyword contained in the retrieved document is made different based on reference values which prescribe the display aspect conforming to the keyword weight.

3. A document retrieval apparatus according to claim 1, further comprising a document ranking unit for calculating a summation of the keyword weights for a plurality of retrieved documents, so as to rank the retrieved documents in accordance with summation values.

4. The document retrieval apparatus according to claim 1, further comprising:
 a thesaurus/dictionary unit for holding relevant words which are relevant to other words, respectively, and degrees of relevance between the relevant words and the other words, respectively, wherein:
 the document retrieval unit retrieves the retrieved documents from the document database based on the retrieval keyword and a relevant word, from among the relevant words, relevant to the retrieval keyword according to the thesaurus/dictionary unit;
 the keyword weight calculation unit factors a degree of relevance between the relevant word and the retrieval keyword according to the thesaurus/dictionary unit into the calculating of the keyword weight and
 the display process unit displays the retrieved document in a state where the relevant word relevant to the retrieval keyword contained in the retrieved document is presented in a display aspect reflecting the keyword weight.

5. The document retrieval apparatus according to claim 1, wherein the document retrieval apparatus automatically selects a feature word, which reflects contents of an inputted document, as the retrieval keyword, the feature word being selected based on either: the feature word having a high occurrence frequency, or the feature word being a title.

6. The document retrieval apparatus according to claim 5, further comprising:

a keyword selection input unit for accepting selection of the retrieval keyword from either of an input document and a previously retrieved document, wherein the display process unit displays the input document and the retrieved document in a state where a word corresponding to the selected retrieval keyword, in either of the input document or the retrieved document, whichever the keyword selection input unit did not accept selection of the retrieval keyword from, is presented in a display aspect reflecting the keyword weight.

7. The document retrieval apparatus according to claim 5, further comprising:

a candidate document selection input unit for accepting selection of the retrieved document from among a plurality of displayed retrieved document candidates, wherein the display process unit displays the input document in a state where the retrieval keyword contained in the input document is presented in a display aspect reflecting the keyword weight.

8. A computer-readable storage medium encoded with a computer program readable by a computer, the computer program instructing the computer to execute a method comprising:

accepting input of a retrieval keyword for retrieving a document;

retrieving the document from the document database based on the retrieval keyword;

calculating a keyword weight of the retrieval keyword, which represents at least a degree of relevance between the retrieval keyword and contents of the retrieved document, the calculating of the keyword weight of the retrieval keyword being conducted in part by multiplying both:

a number of occurrences of the retrieval keyword in the retrieved document, and a preset weight of the retrieval keyword, which is set before the document is retrieved, and which represents a relative importance of the retrieval keyword with respect to other retrieval keywords in a same search query; and displaying the retrieved document in a state where the retrieval keyword contained in the retrieved document is presented in a display aspect reflecting the keyword weight by changing a density of highlighting, changing a sort of meshing and changing a gradation of a background.

9. A document retrieval method for retrieving a retrieved document from a document database in which documents are registered, and displaying the retrieved document, the document retrieval method comprising:

inputting of a retrieval keyword for retrieving the retrieved document;

retrieving the retrieved document from the document database based on the retrieval keyword;

calculating a keyword weight of the retrieval keyword, which represents at least a degree of relevance between the retrieval keyword and contents of the retrieved document, the calculating of the keyword weight of the retrieval keyword being conducted in part by multiplying both:

a number of occurrences of the retrieval keyword in the retrieved document, and a preset weight of the retrieval keyword, which is set before the document is retrieved, and which represents a relative importance of the retrieval keyword with respect to other retrieval keywords in a same search query; and displaying the retrieved document in a state where the retrieval keyword contained in the retrieved document is presented in a display aspect reflecting the keyword weight by changing a density of highlighting, changing a sort of meshing and changing a gradation of a background.

10. A document retrieval apparatus according to claim 1, further comprising:

a keyword input unit for accepting input of a retrieval keyword for retrieving the document, wherein the retrieval keyword is a keyword input by a user using the keyword input unit.

* * * * *